(12) United States Patent
Urabe

(10) Patent No.: US 9,043,123 B2
(45) Date of Patent: May 26, 2015

(54) ENGINE RESTART CONTROL DEVICE

(71) Applicant: SUZUKI MOTOR CORPORATION, Shizuoka (JP)

(72) Inventor: Hiroshi Urabe, Shizuoka (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 88 days.

(21) Appl. No.: 13/748,502

(22) Filed: Jan. 23, 2013

(65) Prior Publication Data
US 2013/0197787 A1 Aug. 1, 2013

(30) Foreign Application Priority Data

Jan. 27, 2012 (JP) ................................. 2012-015269

(51) Int. Cl.
*B60W 10/20* (2006.01)
*B60W 10/06* (2006.01)
*B60W 30/18* (2012.01)

(52) U.S. Cl.
CPC ............... *B60W 10/06* (2013.01); *B60W 10/20* (2013.01); *B60W 30/18018* (2013.01); *B60W 2540/18* (2013.01)

(58) Field of Classification Search
None
See application file for complete search history.

(56) References Cited

U.S. PATENT DOCUMENTS

| 2002/0086772 | A1* | 7/2002 | Abe et al. .................... 477/102 |
| 2004/0117088 | A1 | 6/2004 | Dilger .......................... 701/41 |
| 2011/0112740 | A1* | 5/2011 | Hashimoto .................... 701/70 |
| 2012/0095670 | A1* | 4/2012 | Piggott ........................ 701/112 |
| 2012/0143467 | A1* | 6/2012 | Yu et al. ..................... 701/102 |
| 2012/0330529 | A1* | 12/2012 | Pebley et al. ................ 701/101 |
| 2013/0311045 | A1* | 11/2013 | Tanimoto et al. ............ 701/42 |

FOREIGN PATENT DOCUMENTS

| EP | 2 248 711 A2 | 11/2010 | |
| JP | 2000-345878 | 12/2000 | |
| JP | 2000345878 | * 12/2000 | ............ F02D 29/02 |
| JP | 2005-271640 | * 10/2005 | ............ B62D 6/00 |

OTHER PUBLICATIONS

Chinese Office Action issued on Feb. 4, 2015 to Chinese Application No. 201310026383.5.

* cited by examiner

*Primary Examiner* — John R Olszewski
*Assistant Examiner* — Jess Whittington
(74) *Attorney, Agent, or Firm* — Stein IP, LLC

(57) ABSTRACT

There is provided an engine restart control device. A controller is configured to stop an engine which is adapted to generate a driving force for running a vehicle when a predetermined stop condition is met and configured to restart the engine when a predetermined restart condition is met after stopping the engine. A steering torque detector is configured to detect a steering torque of a steering wheel which is adapted to be operated by a driver. The controller includes an origin torque setting unit configured to set the steering torque detected by the steering torque detector when the predetermined stop condition is met and the engine is stopped as an origin torque. The controller restarts the engine when the steering torque detected by the steering torque detector exceeds a predetermined threshold with reference to the origin torque set by the origin torque setting unit.

1 Claim, 9 Drawing Sheets

Tcenter: ORIGIN TORQUE USED TO CONTROL RESTART
Tis: STEERING TORQUE AT THE TIME OF TRANSITION TO IDLE STOP STATE
Tnow: PRESENT STEERING TORQUE
Tres: RESTART TORQUE THRESHOLD

FIG. 4

(1) STEERING WHEEL IS ROTATED TO THE RIGHT
    AFTER TRANSITION TO IDLE STOP STATE

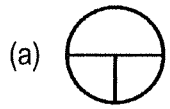
(a)
- STEERING WHEEL IS IN MIDPOINT AT THE TIME OF TRANSITION TO IDLE STOP STATE
- TORQUE SENSOR VALUE = +0.5 [N·m]

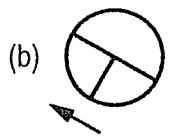
(b)
- DRIVER ROTATES STEERING WHEEL TO THE RIGHT
- ENGINE IS RESTARTED WHEN TORQUE SENSOR VALUE = +2.0 [N·m] AND TRUE TORQUE VALUE = +1.5 [N·m]

(2) STEERING WHEEL IS ROTATED TO THE LEFT
    AFTER TRANSITION TO IDLE STOP STATE

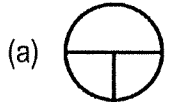
(a)
- STEERING WHEEL IS IN MIDPOINT AT THE TIME OF TRANSITION TO IDLE STOP STATE
- TORQUE SENSOR VALUE = +0.5 [N·m]

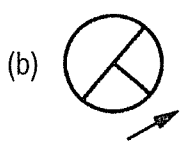
(b)
- DRIVER ROTATES STEERING WHEEL TO THE LEFT
- ENGINE IS RESTARTED WHEN TORQUE SENSOR VALUE = -2.0 [N·m] AND TRUE TORQUE VALUE = -2.5 [N·m]

(1) STEERING WHEEL IS ROTATED TO THE RIGHT
    AFTER TRANSITION TO IDLE STOP STATE

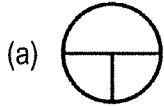
(a)
- STEERING WHEEL IS IN MIDPOINT AT THE TIME OF TRANSITION TO IDLE STOP STATE
- TORQUE SENSOR VALUE = +0.5 [N·m]
- RESTART ORIGIN TORQUE = +0.5 [N·m]

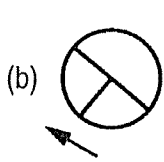
(b)
- DRIVER ROTATES STEERING WHEEL TO THE RIGHT
- ENGINE IS RESTARTED WHEN TORQUE SENSOR VALUE = +2.5 [N·m] AND TRUE TORQUE VALUE = +2.0 [N·m]

(2) STEERING WHEEL IS ROTATED TO THE LEFT
   AFTER TRANSITION TO IDLE STOP STATE

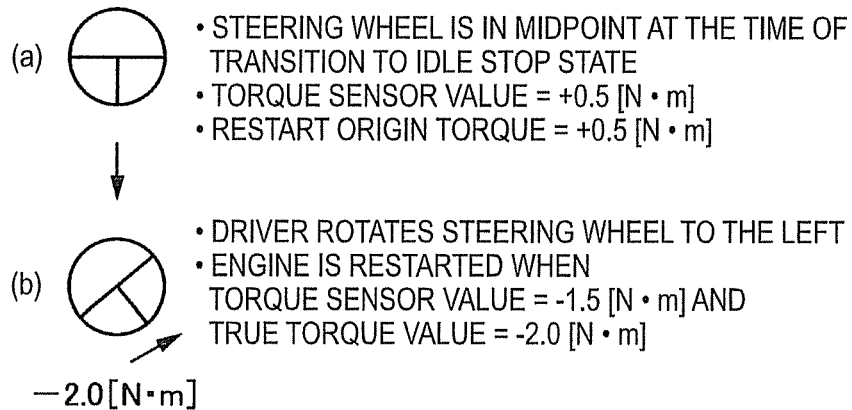

(a) • STEERING WHEEL IS IN MIDPOINT AT THE TIME OF TRANSITION TO IDLE STOP STATE
 • TORQUE SENSOR VALUE = +0.5 [N • m]
 • RESTART ORIGIN TORQUE = +0.5 [N • m]

(b) • DRIVER ROTATES STEERING WHEEL TO THE LEFT
 • ENGINE IS RESTARTED WHEN
  TORQUE SENSOR VALUE = -1.5 [N • m] AND
  TRUE TORQUE VALUE = -2.0 [N • m]

(1) STEERING WHEEL IS ROTATED TO THE RIGHT
   AFTER TRANSITION TO IDLE STOP STATE

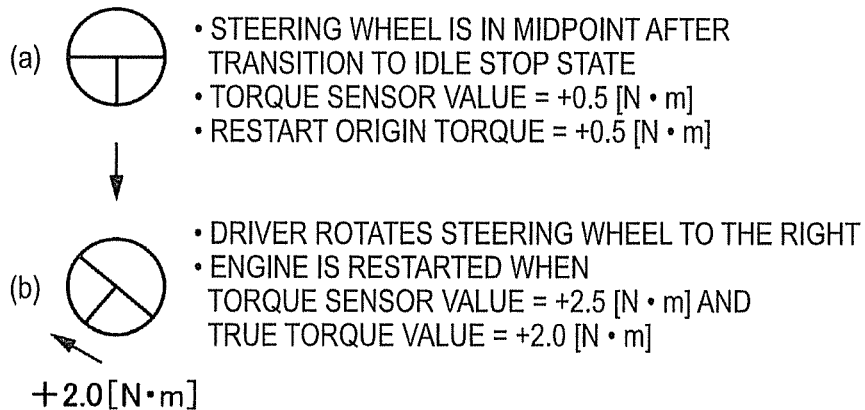

(a) • STEERING WHEEL IS IN MIDPOINT AFTER TRANSITION TO IDLE STOP STATE
 • TORQUE SENSOR VALUE = +0.5 [N • m]
 • RESTART ORIGIN TORQUE = +0.5 [N • m]

(b) • DRIVER ROTATES STEERING WHEEL TO THE RIGHT
 • ENGINE IS RESTARTED WHEN
  TORQUE SENSOR VALUE = +2.5 [N • m] AND
  TRUE TORQUE VALUE = +2.0 [N • m]

(2) STEERING WHEEL IS ROTATED TO THE LEFT
   AFTER TRANSITION TO IDLE STOP STATE

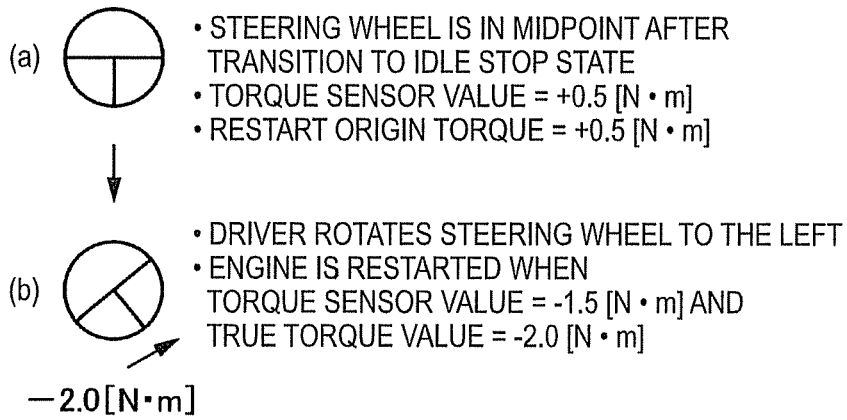

(a) • STEERING WHEEL IS IN MIDPOINT AFTER TRANSITION TO IDLE STOP STATE
 • TORQUE SENSOR VALUE = +0.5 [N • m]
 • RESTART ORIGIN TORQUE = +0.5 [N • m]

(b) • DRIVER ROTATES STEERING WHEEL TO THE LEFT
 • ENGINE IS RESTARTED WHEN
  TORQUE SENSOR VALUE = -1.5 [N • m] AND
  TRUE TORQUE VALUE = -2.0 [N • m]

UNIT: [N·m]

|  | 1) RELATED ART | 2) ADDING ONLY LOGIC FOR SETTING INITIAL VALUE OF RESTART ORIGIN TORQUE | 3) ADDING LOGIC FOR SETTING INITIAL VALUE OF RESTART ORIGIN TORQUE AND LOGIC FOR UPDATING RESTART ORIGIN TORQUE |
|---|---|---|---|
| (1) | +1.5 | +2.0 | +2.0 |
| (2) | -2.5 | -2.0 | -2.0 |

FIG. 11

(1) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE RIGHT AFTER TRANSITION TO IDLE STOP STATE (a) • STEERING WHEEL IS ROTATED TO THE RIGHT AT THE TIME OF TRANSITION TO IDLE STOP STATE
• TORQUE SENSOR VALUE = +1.0 [N·m]

(b) • DRIVER STOPS ROTATION OF STEERING WHEEL
• TORQUE SENSOR VALUE = -0.5 [N·m]

(c) • DRIVER ROTATES STEERING WHEEL TO THE RIGHT
• ENGINE IS RESTARTED WHEN TORQUE SENSOR VALUE = +2.0 [N·m] AND TRUE TORQUE VALUE = +2.5 [N·m]

(2) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE LEFT AFTER TRANSITION TO IDLE STOP STATE

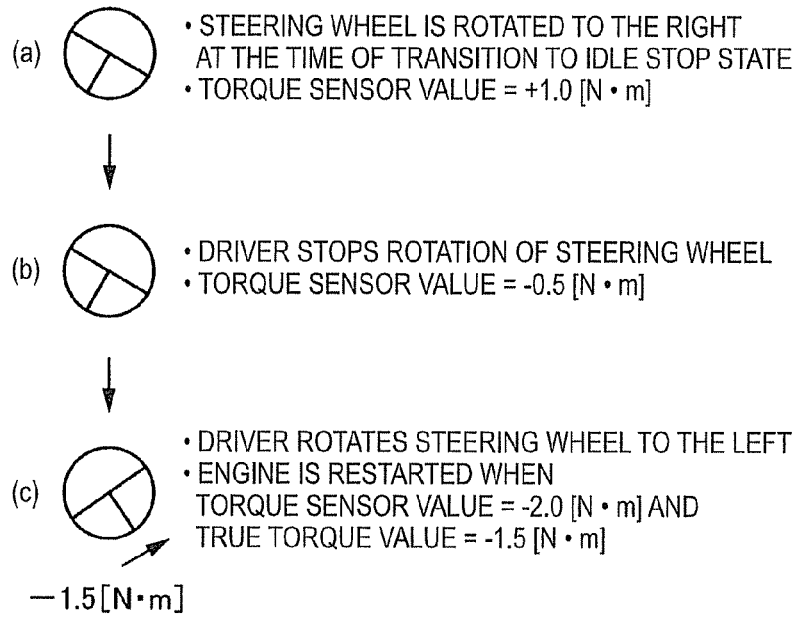

FIG. 13

(1) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE RIGHT AFTER TRANSITION TO IDLE STOP STATE

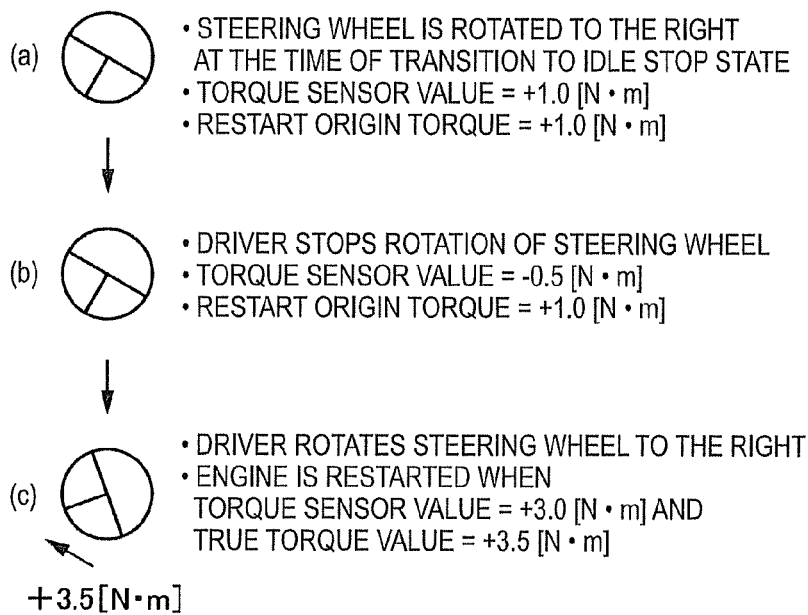

FIG. 14

(2) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE LEFT AFTER TRANSITION TO IDLE STOP STATE (a) 
- STEERING WHEEL IS ROTATED TO THE RIGHT AT THE TIME OF TRANSITION TO IDLE STOP STATE
- TORQUE SENSOR VALUE = +1.0 [N·m]
- RESTART ORIGIN TORQUE = +1.0 [N·m]

(b) 
- DRIVER STOPS ROTATION OF STEERING WHEEL
- TORQUE SENSOR VALUE = -0.5 [N·m]
- RESTART ORIGIN TORQUE = +1.0 [N·m]

(c) 
- DRIVER ROTATES STEERING WHEEL TO THE LEFT
- ENGINE IS RESTARTED WHEN TORQUE SENSOR VALUE = -1.0 [N·m] AND TRUE TORQUE VALUE = -0.5 [N·m]

(1) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE RIGHT AFTER TRANSITION TO IDLE STOP STATE (a) 
- STEERING WHEEL IS ROTATED TO THE RIGHT AT THE TIME OF TRANSITION TO IDLE STOP STATE
- TORQUE SENSOR VALUE = +1.0 [N·m]
- RESTART ORIGIN TORQUE = +1.0 [N·m]

(b) 
- DRIVER STOPS ROTATION OF STEERING WHEEL
- TORQUE SENSOR VALUE = -0.5 [N·m]
- RESTART ORIGIN TORQUE IS UPDATED FROM +1.0 [N·m] TO 0 [N·m] WHILE TORQUE SENSOR VALUE CHANGES FROM +1.0 [N·m] TO 0 [N·m]

(c) 
- DRIVER ROTATES STEERING WHEEL TO THE RIGHT
- ENGINE IS RESTARTED WHEN TORQUE SENSOR VALUE = +2.0 [N·m] AND TRUE TORQUE VALUE = +2.5 [N·m]

(2) STEERING WHEEL IS ROTATED TO THE RIGHT AT THE TIME OF TRANSITION TO IDLE STOP STATE AND DRIVER TEMPORARILY STOPS ROTATION OF STEERING WHEEL AND THEN ROTATES STEERING WHEEL TO THE LEFT AFTER TRANSITION TO IDLE STOP STATE (a)
- STEERING WHEEL IS ROTATED TO THE RIGHT AT THE TIME OF TRANSITION TO IDLE STOP STATE
- TORQUE SENSOR VALUE = +1.0 [N·m]
- RESTART ORIGIN TORQUE = +1.0 [N·m]

(b)
- DRIVER STOPS ROTATION OF STEERING WHEEL
- TORQUE SENSOR VALUE = -0.5 [N·m]
- RESTART ORIGIN TORQUE IS UPDATED FROM +1.0 [N·m] TO 0 [N·m] WHILE TORQUE SENSOR VALUE CHANGES FROM +1.0 [N·m] TO 0 [N·m]

(c)
- DRIVER ROTATES STEERING WHEEL TO THE LEFT
- ENGINE IS RESTARTED WHEN TORQUE SENSOR VALUE = -2.0 [N·m] AND TRUE TORQUE VALUE = -1.5 [N·m]

UNIT: [N·m]

|  | 1) RELATED ART | 2) ADDING ONLY LOGIC FOR SETTING INITIAL VALUE OF RESTART ORIGIN TORQUE | 3) ADDING LOGIC FOR SETTING INITIAL VALUE OF RESTART ORIGIN TORQUE AND LOGIC FOR UPDATING RESTART ORIGIN TORQUE |
|---|---|---|---|
| (1) | +2.5 | +3.5 | +2.5 |
| (2) | -1.5 | -0.5 | -1.5 |

US 9,043,123 B2

ENGINE RESTART CONTROL DEVICE

CROSS-REFERENCE TO RELATED APPLICATIONS

This application claims the benefit of Japanese Application No. 2012-015269 filed Jan. 27, 2012, including specification, drawings and claims incorporated herein by reference.

BACKGROUND OF THE INVENTION

1. Field of the Invention

The present invention relates to an engine restart control device and, more particularly, to an engine restart control device for a vehicle which has an idle stop function and on which an electric power steering (EPS) system is mounted.

2. Description of the Related Art

There is a vehicle equipped with an engine restart control device including a control means. The control means stops an engine adapted to generate a driving force for running the vehicle when a predetermined stop condition is met and restarts the engine when a predetermined restart condition is met after the stop of the engine.

As an example of such an engine restart control device, there are following ones, for example.

Patent Document 1: Japanese Patent Application Publication No. 2005-271640A

Patent Document 2: Japanese Patent Application Publication No. 2000-345878A

A power steering device for a vehicle according to Patent Document 1 is configured to restart an engine when the change rate of steering torque or the change rate of steering angle of a steering wheel (handle) in an idle stop state exceeds a predetermined threshold.

An engine automatic stop and restart device for a vehicle according to Patent Document 2 is configured to restart an engine when it is determined that a stationary steering operation is carried out on the basis of a steering angle of a steering wheel in an idle stop state.

In this regard, there is a method for detecting the left and right turning of a steering wheel using a steering angle detected by a steering angle detection means (steering angle sensor) or a steering torque detected by a steering torque detection means (torque sensor). However, according to this method, there is a problem that midpoint shift in these detecting means or sensing error in an EPS control means (EPS ECU) of an electric power steering (EPS) system is typically caused. Accordingly, lateral difference in the steering angle of the steering wheel required for restarting an engine may be caused due to the midpoint shift and the sensing error.

Specifically, a vehicle has an idle stop function during stop or an idle stop function during deceleration and a steering torque detection means is equipped with standard on an electric power steering system. In such a vehicle equipped with an engine that can be restarted from an idle stop state when a steering torque detected by the steering torque detection means exceeds a predetermined threshold, a slight steering torque in a left or right direction is detected in an actual steering torque detection means even in a state where a steering torque is not applied to a steering wheel. Further, a sensing error may be caused in an EPS control means of the electric power steering system when sensing a detection signal from the steering torque detection means.

Therefore, a left or right offset ($\Delta T$) is included in the detected sensor torque value. As a result, even when the engine is restarted at the same starting torque threshold (Tres) in the left and right of the steering wheel, there is a difference in the torque required for restarting the engine since a left turning restart torque becomes Tres-$\Delta T$ and a right turning restart torque becomes Tres+$\Delta T$. Consequently, there is a problem that lateral difference in the steering angle of the steering wheel required for restarting the engine is caused.

SUMMARY OF THE INVENTION

It is therefore an object of the present invention to provide an engine restart control device which is capable of preventing the lateral difference in the steering angle of the steering wheel required for restarting an engine by seeking a restart torque origin or a restart angle origin during idle stop using a steering torque detection means or a steering angle detection means.

In order to achieve the above object, according to an aspect of the embodiments of the present invention, there is provided an engine restart control device comprising: a controller configured to stop an engine which is adapted to generate a driving force for running a vehicle when a predetermined stop condition is met and configured to restart the engine when a predetermined restart condition is met after stopping the engine; and a steering torque detector configured to detect a steering torque of a steering wheel which is adapted to be operated by a driver, wherein the controller includes an origin torque setting unit configured to set the steering torque detected by the steering torque detector when the predetermined stop condition is met and the engine is stopped as an origin torque, and wherein the controller restarts the engine when the steering torque detected by the steering torque detector exceeds a predetermined threshold with reference to the origin torque set by the origin torque setting unit.

According to the present invention, it is possible to prevent the lateral difference in the steering angle of the steering wheel required for restarting an engine by seeking a restart torque origin or a restart angle origin during idle stop using a steering torque detection means or a steering angle detection means.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

In the accompanying drawings:

FIG. 4 is a view for explaining a case where an error of a torque sensor value is +0.5 [N·m] and a steering wheel is rotated to the right after transition to an idle stop state in a related art. (Related Art)

FIG. 5 is a view for explaining a case where an error of a torque sensor value is +0.5 [N·m] and a steering wheel is rotated to the left after transition to an idle stop state in a related art. (Related Art)

FIG. 6 is a view for explaining a case where an error of a torque sensor value is +0.5 [N·m], only logic for setting an initial value of a restart origin torque is added and a steering wheel is rotated to the right after transition to an idle stop state. (Embodiment)

FIG. 7 is a view for explaining a case where an error of a torque sensor value is +0.5 [N·m], only logic for setting an initial value of a restart origin torque is added and a steering wheel is rotated to the left after transition to an idle stop state. (Embodiment)

FIG. 8 is a view for explaining a case where an error of a torque sensor value is +0.5 [N·m], logic for setting an initial value of a restart origin torque and logic for updating the restart origin torque are added and a steering wheel is rotated to the right after transition to an idle stop state. (Embodiment)

FIG. 9 is a view for explaining a case where an error of a torque sensor value is +0.5 [N·m], logic for setting an initial value of a restart origin torque and logic for updating the restart origin torque are added and a steering wheel is rotated to the left after transition to an idle stop state. (Embodiment)

FIG. 10 is a view for explaining a true torque value in a case of a related art, a case of adding only logic for setting an initial value of a restart origin torque and a case of adding logic for setting an initial value of a restart origin torque and logic for updating the restart origin torque when an error of a torque sensor value is +0.5 [N·m].

FIG. 11 is a view for explaining a case where an error of a torque sensor value is −0.5 [N·m], a driver rotates a steering wheel to the right at the time of transition to an idle stop state in a related art and a driver temporarily stops the rotation of the steering wheel and then rotates the steering wheel to the right after transition to an idle stop state. (Related Art)

FIG. 12 is a view for explaining a case where an error of a torque sensor value is −0.5 [N·m], a driver rotates a steering wheel to the right at the time of transition to an idle stop state in a related art and a driver temporarily stops the rotation of the steering wheel and then rotates the steering wheel to the left after transition to an idle stop state. (Related Art)

FIG. 13 is a view for explaining a case where an error of a torque sensor value is −0.5 [N·m], only logic for setting an initial value of a restart origin torque is added, a driver rotates a steering wheel to the right at the time of transition to an idle stop state and rotates the steering wheel to the right after transition to an idle stop state. (Embodiment)

FIG. 14 is a view for explaining a case where an error of a torque sensor value is −0.5 [N·m], only logic for setting an initial value of a restart origin torque is added, a driver rotates a steering wheel to the right at the time of transition to an idle stop state and rotates the steering wheel to the left after transition to an idle stop state. (Embodiment)

FIG. 15 is a view for explaining a case where an error of a torque sensor value is −0.5 [N·m], logic for setting an initial value of a restart origin torque and logic for updating the restart origin torque are added, a driver rotates a steering wheel to the right at the time of transition to an idle stop state and rotates the steering wheel to the right after transition to an idle stop state. (Embodiment)

FIG. 16 is a view for explaining a case where an error of a torque sensor value is −0.5 [N·m], logic for setting an initial value of a restart origin torque and logic for updating the restart origin torque are added, a driver rotates a steering wheel to the right at the time of transition to an idle stop state and rotates the steering wheel to the left after transition to an idle stop state. (Embodiment)

FIG. 17 is a view for explaining a true torque value in a case of a related art, a case of adding only logic for setting an initial value of a restart origin torque and a case of adding logic for setting an initial value of a restart origin torque and logic for updating the restart origin torque when an error of a torque sensor value is −0.5 [N·m].

DETAILED DESCRIPTION OF THE EMBODIMENTS

Figure 1:
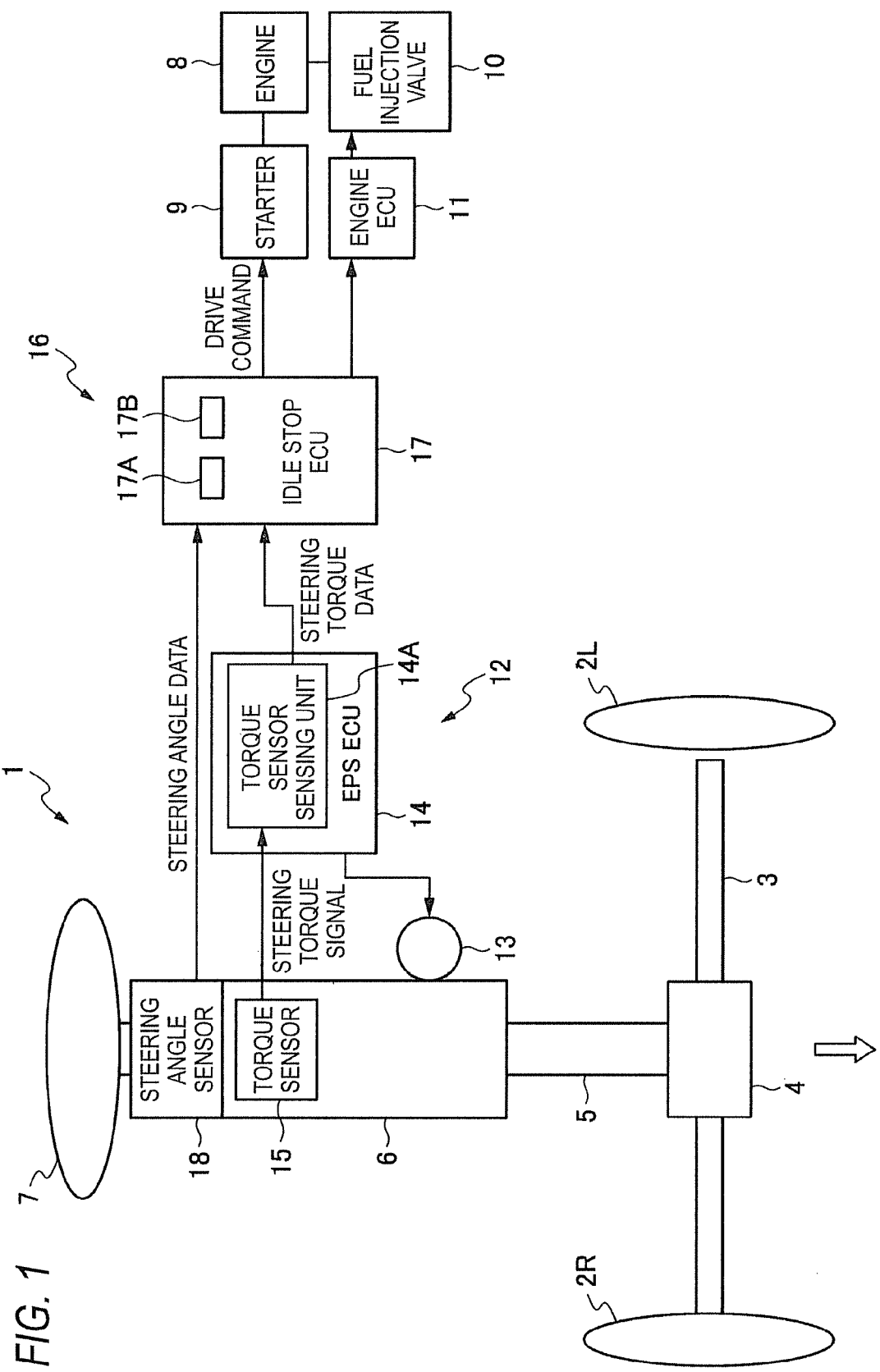
FIG. 1 is a schematic view illustrating a vehicle equipped with an engine restart control device. (Embodiment)

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The object of the present invention to prevent the lateral difference in the steering angle of the steering wheel required for restarting an engine can be realized by seeking a restart torque origin or a restart angle origin during idle stop using a steering torque detection means or a steering angle detection means.

FIGS. 1 to 17 illustrate embodiments of the present invention.

In FIG. 1, reference numeral 1 represents a vehicle, 2L·2R represent a left front wheel-right front wheel as a steered vehicle wheel, 3 represents an axle, 4 represents a gear coupling mechanism (rack and pinion), 5 represents a steering shaft, 6 represents a steering column and 7 represents a steering wheel which can be operated by a driver.

The vehicle 1 has an idle stop function during stop or an idle stop function during deceleration and a steering torque detection means is equipped with standard on an electric power steering system. Such a vehicle is equipped with an engine that can be restarted from an idle stop state when a steering torque detected by the steering torque detection means exceeds a predetermined threshold.

The vehicle 1 is equipped with an engine 8 which generates a driving force for running the vehicle 1. A starter 9 and a fuel injection valve 10 are mounted on the engine 8. The fuel injection valve 10 is actuated and controlled by an engine control means (engine ECU) 11.

Further, the vehicle 1 is equipped with an electric power steering (EPS) system 12. The electric power steering system 12 includes an EPS assist motor 13 mounted on the steering column 6 and an EPS control means (EPS ECU) 14 which actuates and controls the EPS assist motor 13. The EPS control means 14 includes a torque sensor sensing unit 14A. A steering torque detection means (torque sensor) 15 is mounted on the steering column 6 to detect a steering torque of the steering wheel 7. The EPS control means 14 receives a steering torque signal from the steering torque detection means 15 to actuate and control the EPS assist motor 13.

Further, the vehicle 1 is equipped with an engine restart control device 16. The engine restart control device 16 includes an idle stop control means (idle stop ECU) 17 as a control means according to the present embodiment. A steering angle detection means (steering angle sensor) 18 is mounted on the steering column 6 to detect a steering angle (turning angle) of the steering wheel 7. The idle stop control means 17 receives a steering data from the steering angle detection means 18 and a steering torque data from the EPS control means 14 to control the restart of the engine 8 on the basis of these data. The idle stop control means 17 outputs a drive command to control the starter 9 and outputs a control signal to the engine control means 11.

The engine restart control device 16 stops the fuel injection of the fuel injection valve 10 via the engine control means 11 when the engine 8 is stopped.

The engine restart control device 16 stops the engine 8 adapted to generate a driving force for running the vehicle when a predetermined stop condition is met and restarts the engine 8 when a predetermined restart condition is met after the stop of the engine 8.

The idle stop control means 17 includes an origin torque setting means 17A which sets the steering torque detected by the steering torque detection means 15 as an origin torque when the stop condition is met and thus the engine 8 is stopped. The idle stop control means 17 restarts the engine 8 when the steering torque detected by the steering torque detection means 15 exceeds a predetermined threshold (restart torque threshold) with reference to the origin torque set by the origin torque setting means 17A.

Thereby, it is possible to prevent difference in the steering angle (turning angle) of the steering wheel 7 required for restarting the engine 8 in the rotation direction of left and right of the steering wheel 7. That is, it is possible to prevent lateral difference in the steering angle (turning angle) of the steering wheel 7 required for restarting the engine 8 by seeking an origin torque each time when the idle stop is performed.

Further, since there is no need to add a new detection means to the electric power steering system 12, it is possible to reduce the number of parts and to simplify the structure.

Further, the origin torque setting means 17A updates the origin torque on the basis of the steering torque detected by the steering torque detection means 15 when the absolute value of the steering torque detected by the steering torque detection means 15 becomes smaller than the absolute value of the set origin torque.

The steering torque occurs when a driver makes transition to the idle stop state and the steering wheel 7 is rotated, but does not occur when rotation of the steering wheel 7 is stopped. When it is determined that a driver stops the steering wheel 7 due to changes in the steering torque, the origin torque is updated and thus it is possible to set the origin torque with high-precision.

Furthermore, the idle stop control means (ECU) 17 is coupled to the steering angle detection means (steering angle sensor) 18 which is mounted on the steering column 6 to detect the steering angle (turning angle) of the steering wheel 7.

The idle stop control means (ECU) 17 includes an origin angle setting means 17B which sets the steering angle detected by the steering angle detection means 18 as an origin angle when the stop condition is met and thus the engine 8 is stopped. The idle stop control means 17 restarts the engine 8 when the steering angle detected by the steering angle detection means 18 exceeds a predetermined threshold (restart angle threshold) with reference to the origin angle set by the origin angle setting means.

Thereby, it is possible to prevent difference in the steering angle of the steering wheel 7 required for restarting the engine 8 in the rotation direction of left and right of the steering wheel 7.

Further, the origin angle setting means 17B updates the origin torque on the basis of the steering torque detected by the steering torque detection means 15 and further updates the origin angle on the basis of the steering angle detected by the steering angle detection means 18 when the absolute value of the steering torque detected by the steering torque detection means 15 becomes smaller than the absolute value of the set origin torque.

The steering torque occurs when a driver makes transition to the idle stop state and the steering wheel 7 is rotated, but does not occur when rotation of the steering wheel 7 is stopped. When it is determined that a driver stops the steering wheel 7 due to changes in the steering torque, the origin angle is updated and thus it is possible to set the origin angle with high-precision.

Next, a case of restarting an engine on the basis of a steering torque will be described in accordance with a flowchart in FIG. 2. In the flowchart illustrated in FIG. 2, a restart origin torque (Tcenter) is set and a control is made to restart the engine 8 when a steering torque is applied which exceeds a restart torque threshold (Tres) in the right side or left side from the restart origin torque (Tcenter).

Figure 2:
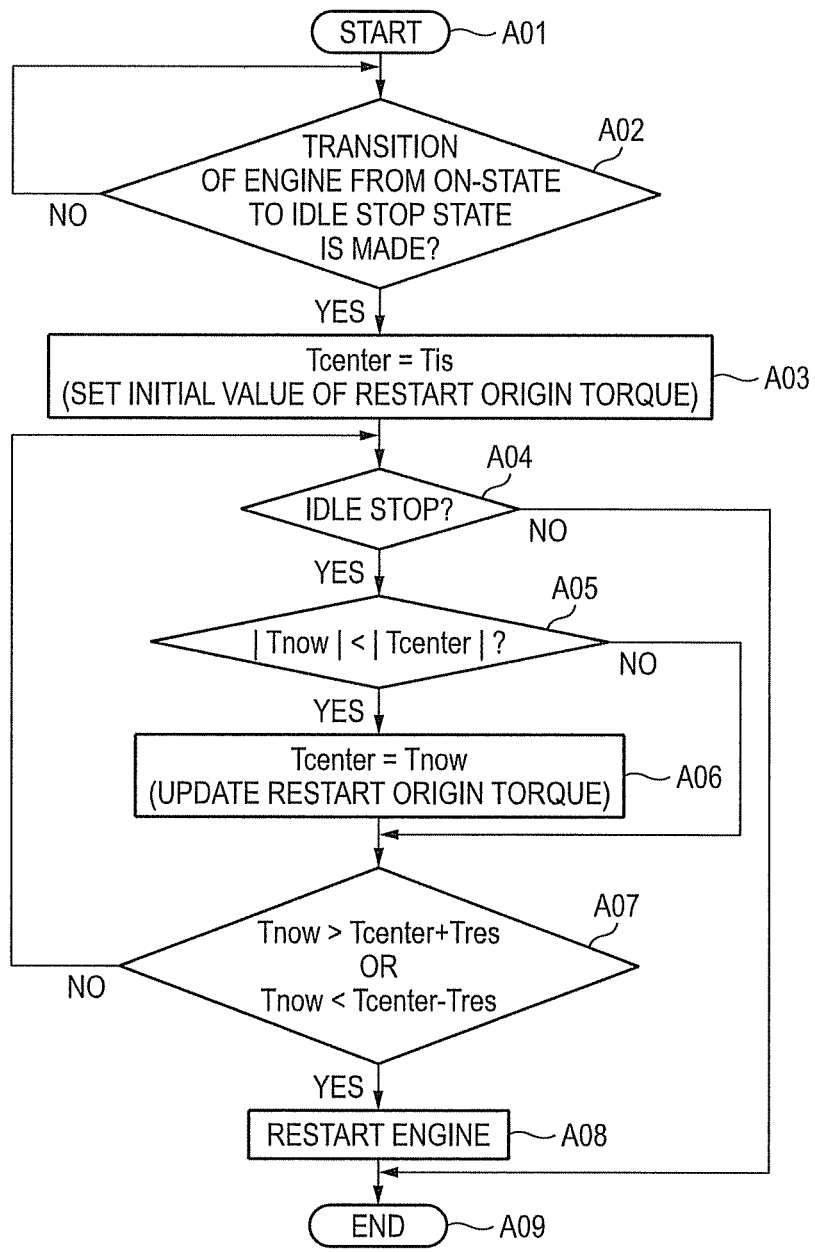
FIG. 2 is a flowchart illustrating the restart control by a steering torque. (Embodiment)

As illustrated in FIG. 2, when a program is started (step A01), first, it is determined whether transition from an on-state to an idle stop state of the engine 8 it made or not (step A02). If "NO" is determined in step A02, this determination step is continued.

If "YES" is determined in step A02, the origin torque (Tcenter) which is used to control restart is set using a steering torque (Tis) at the time of transition to the idle stop state as an initial value of the restart origin torque (step A03). And; it is determined whether the engine is in the idle stop state or not (step A04).

If "YES" is determined in step A04, it is determined whether |Tnow| is smaller than |Tcenter| or not (step A05). Here, Tnow indicates a present steering torque.

If "YES" is determined in step A05, the restart origin torque is updated using the present steering torque (Tnow) as the origin torque (Tcenter) which is used to control restart (step A06).

After step A06 is processed or if "NO" is determined in step A05, it is determined whether Tnow is larger than (Tcenter+Tres) or not or it is determined whether Tnow is smaller than (Tcenter−Tres) or not (step A07). Here, Tres indicates a restart torque threshold.

If "NO" is determined in step A07, the whole process returns to step A04.

If "YES" is determined in step A07, this means that the steering torque is varied from the origin torque (Tcenter) used to control restart by the restart torque threshold (Tres) and therefore the engine 8 is restarted (step A08).

After step A08 is processed or if "NO" is determined in step A04, the program is ended (step A09).

Next, a case of restarting an engine on the basis of a steering angle will be described in accordance with a flowchart in FIG. 3. In the flowchart illustrated in FIG. 3, a restart origin angle (Acenter) is set and a control is made to restart the engine 8 when a steering angle is detected which exceeds a restart angle threshold (Ares) in the right side or left side from the restart origin angle (Acenter).

Figure 3:
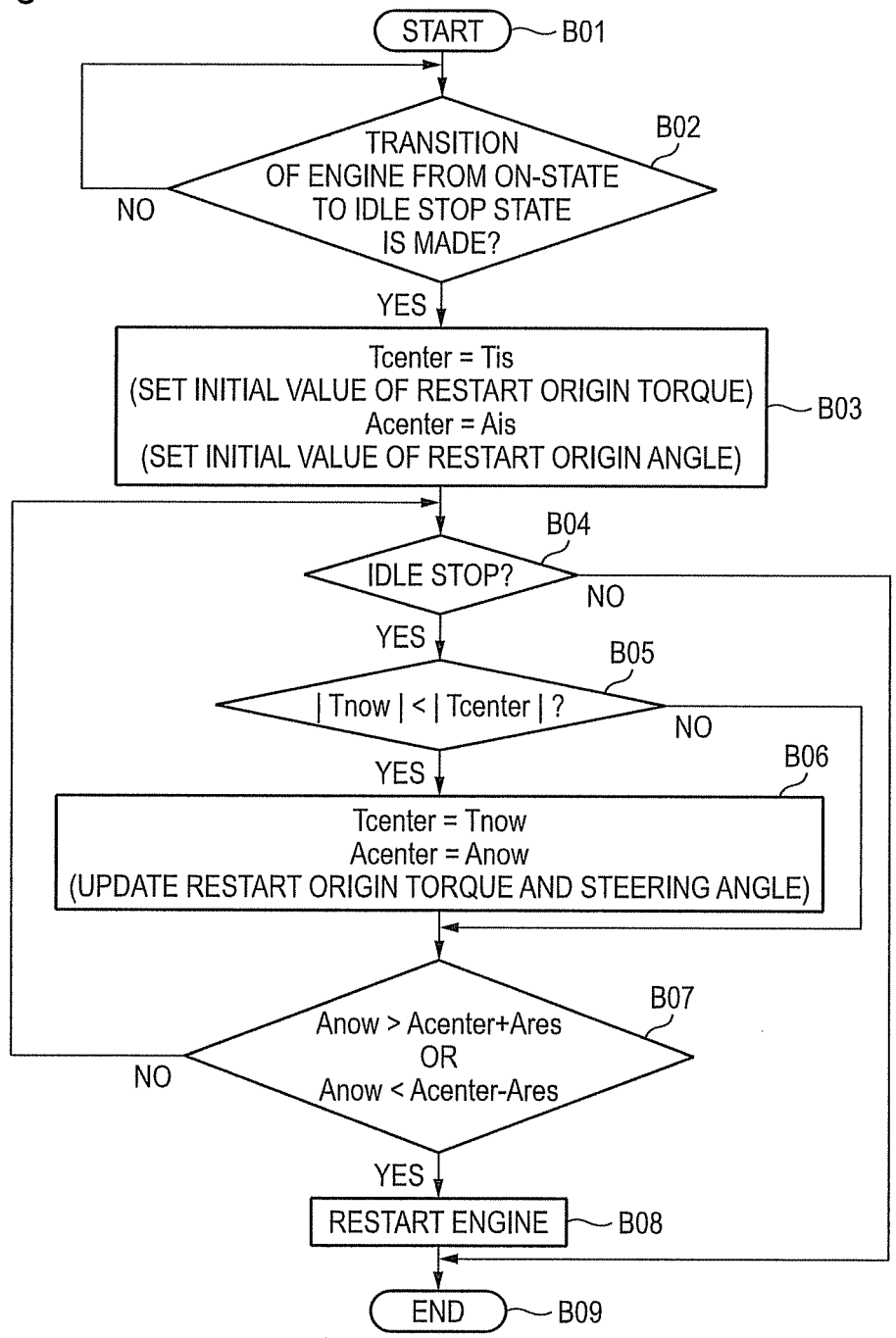
FIG. 3 is a flowchart illustrating the restart control by a steering angle. (Embodiment)

As illustrated in FIG. 3, when a program is started (step B01), first, it is determined whether transition from an on-state to an idle stop state of the engine 8 is made or not (step B02). If "NO" is determined in step B02, this determination step is continued.

If "YES" is determined in step B02, an origin torque (Tcenter) used to update an origin angle (Acenter) which is used to control restart is set using a steering torque (Tis) at the time of transition to the idle stop state as an initial value of the restart origin torque and the origin angle (Acenter) which is used to control restart is set using a steering angle (Ais) at the time of transition to the idle stop state as an initial value of the restart origin angle (step B03). And, it is determined whether the engine is in the idle stop state or not (step B04).

If "YES" is determined in step B04, it is determined whether |Tnow| is smaller than |Tcenter| or not (step B05). Here, Tnow indicates a present steering torque.

If "YES" is determined in step B05, the restart origin torque is updated using the present steering torque (Tnow) as the origin torque (Tcenter) used to update the origin angle (Acenter) which is used to control restart and the restart origin angle is updated using a present steering angle (Anow) as the origin angle (Acenter) which is used to control restart (step B06).

After step B06 is processed or if "NO" is determined in step B05, it is determined whether Anow is larger than (Acenter+Ares) or not or it is determined whether Anow is smaller than (Acenter−Ares) or not (step B07). Here, Ares indicates a restart angle threshold.

If "NO" is determined in step B07, the whole process returns to step B04.

If "YES" is determined in step B07, this means that the steering angle is varied from the origin angle (Acenter) used to control restart by the restart angle threshold (Ares) and therefore the engine 8 is restarted (step B08).

After step B08 is processed or if "NO" is determined in step B04, the program is ended (step B09).

Hereinafter, a steering torque sensor value (hereinafter, referred to as 'torque sensor value') used to restart the engine and a true torque value will be specifically described when a driver turns the steering wheel, in three cases including a case of related art, a case of adding only logic for setting an initial value of a restart origin torque and a case of adding logic for setting an initial value of a restart origin torque and logic for updating the restart origin torque.

Here, the true torque value means a torque value which is obtained by correcting an error of the torque sensor value and experienced by a driver. Further, the restart torque threshold (Tres) is set as +2.0 [N·m]. Further, a torque sensor value (Tres) when turning the steering wheel in the right side is indicated in "+" and a torque sensor value (Tres) when turning the steering wheel in the left side is indicated in "−."

(A) First, a case where the torque sensor value is set as +0.5 [N·m] when the steering wheel is in the midpoint, that is, a case where an error of the torque sensor value is +0.5 [N·m] will be described.

1) A case of a related art (1) When the steering wheel is rotated to the right after transition to the idle stop state As illustrated in FIG. 4 (a), the steering wheel is in the midpoint at the time of transition to the idle stop state and the torque sensor value is +0.5 [N·m].

As illustrated in FIG. 4 (b), the engine is restarted when the torque sensor value becomes +2.0 [N−m] and the true torque value becomes +1.5 [N·m] as a driver rotates the steering wheel to the right.

(2) When the steering wheel is rotated to the left after transition to the idle stop state As illustrated in FIG. 5 (a), the steering wheel is in the midpoint at the time of transition to the idle stop state and the torque sensor value is +0.5 [N·m].

As illustrated in FIG. 5 (b), the engine is restarted when the torque sensor value becomes −2.0 [N·m] and the true torque value becomes −2.5 [N·m] as a driver rotates the steering wheel to the left.

2) A case of adding only logic for setting an initial value of a restart origin torque (1) When the steering wheel is rotated to the right after transition to the idle stop state As illustrated in FIG. 6 (a), the steering wheel is in the midpoint at the time of transition to the idle stop state and the torque sensor value is +0.5 [N·m]. Accordingly, the restart origin torque becomes +0.5 [N·m].

As illustrated in FIG. 6 (b), the engine is restarted when the torque sensor value becomes +2.5 [N·m] and the true torque value becomes +2.0 [N·m] as a driver rotates the steering wheel to the right.

(2) When the steering wheel is rotated to the left after transition to the idle stop state As illustrated in FIG. 7 (a), the steering wheel is in the midpoint at the time of transition to the idle stop state and the torque sensor value is +0.5 [N·m]. Accordingly, the restart origin torque becomes +0.5 [N·m].

As illustrated in FIG. 7 (b), the engine is restarted when the torque sensor value becomes −1.5 [N·m] and the true torque value becomes −2.0 [N·m] as a driver rotates the steering wheel to the left.

3) A case of adding logic for setting an initial value of a restart origin torque and logic for updating the restart origin torque (1) When the steering wheel is rotated to the right after transition to the idle stop state As illustrated in FIG. 8 (a), the steering wheel is in the midpoint at the time of transition to the idle stop state and the torque sensor value is +0.5 [N·m]. Accordingly, the restart origin torque becomes +0.5 [N·m].

As illustrated in FIG. 8 (b), the engine is restarted when the torque sensor value becomes +2.5 [N·m] and the true torque value becomes +2.0 [N·m] as a driver rotates the steering wheel to the right.

(2) When the steering wheel is rotated to the left after transition to the idle stop state As illustrated in FIG. 9 (a), the steering wheel is in the midpoint at the time of transition to the idle stop state and the torque sensor value is +0.5 [N·m]. Accordingly, the restart origin torque becomes +0.5 [N·m].

As illustrated in FIG. 9 (b), the engine is restarted when the torque sensor value becomes −1.5 [N·m] and the true torque value becomes −2.0 [N·m] as a driver rotates the steering wheel to the left.

4) As a result of the above description, the true torque values when an engine is restarted are represented in FIG. 10.

As a result, in order to prevent difference in the steering angle of the steering wheel required for restarting the engine in the rotation direction of left and right of the steering wheel, the restart torque threshold (Tres) is +2.0 [N·m]. Accordingly, it is preferable that the engine is restarted when the true torque value becomes +2.0 [N·m] in a case where the steering wheel is rotated to the right and when the true torque value becomes −2.0 [N·m] in a case where the steering wheel is rotated to the left.

However, since an error of the torque sensor value is +0.5 [N·m] in '1) a case of a related art' mentioned above, the engine is restarted when the true torque value becomes +1.5 [N·m] in a case where the steering wheel is rotated to the right and when the true torque value becomes −2.5 [N·m] in a case where the steering wheel is rotated to the left.

Meanwhile, in '2) a case of adding only logic for setting an initial value of a restart origin torque' mentioned above and '3) a case of adding logic for setting an initial value of a restart origin torque and logic for updating the restart origin torque' mentioned above, the engine is restarted when the true torque value becomes +2.0 [N·m] in a case where the steering wheel is rotated to the right and when the true torque value becomes −2.0 [N·m] in a case where the steering wheel is rotated to the left, even if an error of the torque sensor value is +0.5 [N·m].

From the above results, it is found that '2) a case of adding only logic for setting an initial value of a restart origin torque' and '3) a case of adding logic for setting an initial value of a restart origin torque and logic for updating the restart origin torque' have improvement with respect to '1) a case of a related art'.

(B) Next, a case where the torque sensor value is set as −0.5 [N·m] when the steering wheel is in the midpoint, that is, a case where an error of the torque sensor value is −0.5 [N·m] will be described.

1) A case of a related art (1) When a driver rotates the steering wheel to the right at the time of transition to the idle stop state and a driver temporarily stops rotation of the steering wheel and then rotates the steering wheel to the right after transition to the idle stop state As illustrated in FIG. 11 (a), the steering wheel is rotated to the right at the time of transition to the idle stop state and at this time the torque sensor value becomes +1.0 [N·m].

As illustrated in FIG. 11 (b), when a driver stops rotation of the steering wheel, the torque sensor value becomes −0.5 [N·m].

Further, as illustrated in FIG. 11 (c), when a driver rotates the steering wheel to the right, the engine is restarted when the torque sensor value becomes +2.0 [N·m] and the true torque value becomes +2.5 [N·m].

(2) When a driver rotates the steering wheel to the right at the time of transition to the idle stop state and a driver temporarily stops rotation of the steering wheel and then rotates the steering wheel to the left after transition to the idle stop state As illustrated in FIG. 12 (a), the steering wheel is rotated to the right at the time of transition to the idle stop state and at this time the torque sensor value becomes +1.0 [N·m].

As illustrated in FIG. 12 (b), when a driver stops rotation of the steering wheel, the torque sensor value becomes −0.5 [N·m].

Further, as illustrated in FIG. 12 (c), when a driver rotates the steering wheel to the left, the engine is restarted when the torque sensor value becomes −2.0 [N·m] and the true torque value becomes −1.5 [N·m].

2) A case of adding only logic for setting an initial value of a restart origin torque (1) When a driver rotates the steering wheel to the right at the time of transition to the idle stop state and a driver temporarily stops rotation of the steering wheel and then rotates the steering wheel to the right after transition to the idle stop state As illustrated in FIG. 13 (a), the steering wheel is rotated to the right at the time of transition to the idle stop state and at this time the torque sensor value becomes +1.0 [N·m]. Accordingly, the restart origin torque becomes +1.0 [N·m].

As illustrated in FIG. 13 (b), when a driver stops rotation of the steering wheel, the torque sensor value becomes −0.5 [N·m]. The restart origin torque is still +1.0 [N·m].

Further, as illustrated in FIG. 13 (c), when a driver rotates the steering wheel to the right, the engine is restarted when the torque sensor value becomes +3.0 [N·m] and the true torque value becomes +3.5 [N·m].

(2) When a driver rotates the steering wheel to the right at the time of transition to the idle stop state and a driver temporarily stops rotation of the steering wheel and then rotates the steering wheel to the left after transition to the idle stop state As illustrated in FIG. 14 (a), the steering wheel is rotated to the right at the time of transition to the idle stop state and at this time the torque sensor value becomes +1.0 [N·m]. Accordingly, the restart origin torque becomes +1.0 [N·m].

As illustrated in FIG. 14 (b), when a driver stops rotation of the steering wheel, the torque sensor value becomes −0.5 [N·m]. The restart origin torque is still +1.0 [N·m].

Further, as illustrated in FIG. 14 (c), when a driver rotates the steering wheel to the left, the engine is restarted when the torque sensor value becomes −1.0 [N·m] and the true torque value becomes −0.5 [N·m].

3) A case of adding logic for setting an initial value of a restart origin torque and logic for updating the restart origin torque (1) When a driver rotates the steering wheel to the right at the time of transition to the idle stop state and a driver temporarily stops rotation of the steering wheel and then rotates the steering wheel to the right after transition to the idle stop state As illustrated in FIG. 15 (a), the steering wheel is rotated to the right at the time of transition to the idle stop state and at this time the torque sensor value becomes +1.0 [N·m]. Accordingly, the restart origin torque becomes +1.0 [N·m].

As illustrated in FIG. 15 (b), when a driver stops rotation of the steering wheel, the torque sensor value becomes −0.5 [N·m]. While the torque sensor value is varied from +1.0 [N·m] to 0 [N·m], the restart origin torque is updated from +1.0 [N·m] to 0 [N·m].

Further, as illustrated in FIG. 15 (c), the engine is restarted when the torque sensor value becomes +2.0 [N·m] and the true torque value becomes +2.5 [N·m] as a driver rotates the steering wheel to the right.

(2) When a driver rotates the steering wheel to the right at the time of transition to the idle stop state and a driver temporarily stops rotation of the steering wheel and then rotates the steering wheel to the left after transition to the idle stop state As illustrated in FIG. 16 (a), the steering wheel is rotated to the right at the time of transition to the idle stop state and at this time the torque sensor value becomes +1.0 [N·m]. Accordingly, the restart origin torque becomes +1.0 [N·m].

As illustrated in FIG. 16 (b), when a driver stops rotation of the steering wheel, the torque sensor value becomes −0.5 [N·m]. While the torque sensor value is varied from +1.0 [N·m] to 0 [N·m], the restart origin torque is updated from +1.0 [N·m] to 0 [N·m].

Further, as illustrated in FIG. 16 (c), the engine is restarted when the torque sensor value becomes −2.0 [N·m] and the true torque value becomes −1.5 [N·m] as a driver rotates the steering wheel to the left.

4) As a result of the above description, the true torque values when an engine is restarted are represented in FIG. 17.

As a result, in order to prevent difference in the steering angle of the steering wheel required for restarting the engine in the rotation direction of left and right of the steering wheel, the restart torque threshold (Tres) is +2.0 [N·m]. Accordingly, it is preferable that the engine is restarted when the true torque value becomes +2.0 [N·m] in a case where the steering wheel is rotated to the right and when the true torque value becomes −2.0 [N·m] in a case where the steering wheel is rotated to the left.

However, since an error of the steering torque sensor value is −0.5 [N·m] in '1) a case of a related art' mentioned above, the engine is restarted when the true torque value becomes +2.5 [N·m] in a case where the steering wheel is rotated to the right and when the true torque value becomes −1.5 [N·m] in a case where the steering wheel is rotated to the left.

Meanwhile, in '2) a case of adding only logic for setting an initial value of a restart origin torque' mentioned above, from the result of setting the origin torque, the engine is restarted when the true torque value becomes +3.5 [N·m] in a case where the steering wheel is rotated to the right and when the true torque value becomes −0.5 [N·m] in a case where the steering wheel is rotated to the left. Thereby, '2) a case of adding only logic for setting an initial value of a restart origin torque' mentioned above gets worse with respect to '1) a case of a related art.'

However, since the origin torque is updated in '3) a case of adding logic for setting an initial value of a restart origin torque and logic for updating the restart origin torque' mentioned above, the engine is restarted when the true torque value becomes +2.5 [N·m] in a case where the steering wheel is rotated to the right and when the true torque value becomes −1.5 [N·m] in a case where the steering wheel is rotated to the left. This value is the same as '1) a case of a related art' mentioned above.

From the above results, it is found that if logic for updating the restart origin torque is added even in a case of adding logic for setting an initial value of a restart origin torque, the result does not get worse with respect to '1) a case of a related art' mentioned above.

The engine restart control device according to the present invention may be applied to various vehicles.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An engine restart control device comprising:

a controller configured to stop an engine which is adapted to generate a driving force for running a vehicle when a predetermined stop condition is met and configured to restart the engine when a predetermined restart condition is met after stopping the engine; and a steering torque detector configured to detect a steering torque of a steering wheel which is adapted to be operated by a driver, wherein the controller is configured to set, as an origin torque, a value of the steering torque detected by the steering torque detector at a time when the predetermined stop condition is met and the engine is stopped, and wherein the controller restarts the engine when the value of the steering torque detected by the steering torque detector after the controller sets the value of the steering torque as the origin torque exceeds a predetermined threshold which is set with reference to the set origin torque wherein the controller updates the set origin torque to the value of the steering torque detected by the steering torque detector if an absolute value of the steering torque detected by the steering torque detector becomes smaller than an absolute value of the set origin torque after the controller sets the value of the steering torque as the origin torque and before the controller restarts the engine.

* * * * *